United States Patent
Sato et al.

(10) Patent No.: US 11,735,797 B2
(45) Date of Patent: Aug. 22, 2023

(54) COATING SOLUTION FOR LITHIUM ION BATTERY SEPARATORS AND LITHIUM ION BATTERY SEPARATOR

(71) Applicant: MITSUBISHI PAPER MILLS LIMITED, Tokyo (JP)

(72) Inventors: Tomohiro Sato, Tokyo (JP); Hideaki Saegusa, Tokyo (JP); Makoto Kato, Tokyo (JP); Noriko Kasai, Tokyo (JP); Kukjin Yoon, Tokyo (JP)

(73) Assignee: MITSUBISHI PAPER MILLS LIMITED, Tokyo (JP)

(*) Notice: Subject to any disclaimer, the term of this patent is extended or adjusted under 35 U.S.C. 154(b) by 355 days.

(21) Appl. No.: 16/963,406

(22) PCT Filed: Jan. 23, 2019

(86) PCT No.: PCT/JP2019/002024
§ 371 (c)(1),
(2) Date: Jul. 20, 2020

(87) PCT Pub. No.: WO2019/146626
PCT Pub. Date: Aug. 1, 2019

(65) Prior Publication Data
US 2021/0074981 A1   Mar. 11, 2021

(30) Foreign Application Priority Data

Jan. 25, 2018 (JP) ................ 2018-010983
Sep. 28, 2018 (JP) ................ 2018-184232

(51) Int. Cl.
| | |
|---|---|
| H01M 50/403 | (2021.01) |
| H01M 50/429 | (2021.01) |
| H01M 50/44 | (2021.01) |
| H01M 50/446 | (2021.01) |
| H01M 10/0525 | (2010.01) |
| H01M 50/443 | (2021.01) |

(52) U.S. Cl.
CPC ..... H01M 50/403 (2021.01); H01M 10/0525 (2013.01); H01M 50/4295 (2021.01); H01M 50/44 (2021.01); H01M 50/443 (2021.01); H01M 50/446 (2021.01)

(58) Field of Classification Search
CPC ........... H01M 50/403; H01M 50/4295; H01M 50/44; H01M 50/446; H01M 10/0525
See application file for complete search history.

(56) References Cited

U.S. PATENT DOCUMENTS

| | | | |
|---|---|---|---|
| 2013/0130092 A1 | 5/2013 | Roth et al. | |
| 2015/0263325 A1* | 9/2015 | Honda | H01M 50/457 |
| | | | 429/144 |
| 2015/0333308 A1 | 11/2015 | Toyoda et al. | |
| 2016/0264868 A1 | 9/2016 | Gordon et al. | |
| 2017/0294637 A1 | 10/2017 | Sato et al. | |

FOREIGN PATENT DOCUMENTS

| | | |
|---|---|---|
| JP | 2008-4439 | 1/2008 |
| JP | 2009-532315 | 9/2009 |
| JP | 2012-134024 | 7/2012 |
| JP | 2013-133418 | 7/2013 |
| JP | 2013133418 A * | 7/2013 |
| JP | 2013-541128 | 11/2013 |
| JP | 2014-229406 | 12/2014 |
| JP | 2016-515988 | 6/2016 |
| WO | 2007/117841 | 10/2007 |
| WO | 2014/083988 | 6/2014 |
| WO | 2016/043142 | 3/2016 |

OTHER PUBLICATIONS

JP2013133418A—Machine Translation (Year: 2013).*
International Search Report dated Mar. 5, 2019, in International (PCT) Application No. PCT/JP2019/002024.
"Safety Technologies and Materials for Lithium-ion Batteries", Satoh, et al., ed., CMC Publisher, Sep. 9, 2014, p. 145.
Extended European Search Report dated Jan. 25, 2022 in corresponding European Patent Application No. 19743957.3.
Partial Supplementary European Search Report dated Nov. 3, 2021 in corresponding European Patent Application No. 19743957.3.

* cited by examiner

*Primary Examiner* — Brian R Ohara
*Assistant Examiner* — Patrick Marshall Greene
(74) *Attorney, Agent, or Firm* — Wenderoth, Lind & Ponack, L.L.P.

(57) ABSTRACT

A coating solution for lithium ion battery separators which comprises inorganic particles, an organic polymer binder and carboxymethyl cellulose having an etherification rate of 1.10 to 2.00 or a salt thereof, or a coating solution for lithium ion battery separators comprising inorganic particles containing magnesium hydroxide having a linseed oil absorption of 30 to 80 (g/100 g), and a separator having a coating layer formed from the coating solution on a substrate and high safety and low internal resistance.

3 Claims, No Drawings

COATING SOLUTION FOR LITHIUM ION BATTERY SEPARATORS AND LITHIUM ION BATTERY SEPARATOR

TECHNICAL FIELD

The present invention relates to a coating solution for lithium ion battery separators ("coating solution for lithium ion battery separators may be simply referred to as "coating solution" hereinafter) and a lithium ion battery separator obtained by applying the coating solution to a substrate.

BACKGROUND ART

A lithium ion battery separator for preventing contact between a positive electrode and a negative electrode is used in a lithium ion battery ("lithium ion battery" may be simply referred to as "battery" hereinafter).

A porous film made of polyethylene or polypropylene which has been used as a lithium ion battery separator ("lithium ion battery separator" may be simply referred to as "separator" hereinafter) has low heat resistance and therefore involves a big safety problem. That is, in the case of a battery including this porous film as a separator, when local heat generation occurs in the inside of the battery due to an internal short-circuit, the separator around this heat generating site shrinks, whereby the internal short-circuit further spreads and thermal runaway occurs, thereby causing a serious phenomenon such as fire or explosion.

To solve this problem, there is proposed a separator comprising inorganic particles such as alumina or boehmite (refer to Patent Documents 1 to 4). This separator comprises a porous film, a substrate such as nonwoven fabric and a coating layer containing inorganic particles.

To produce a separator containing inorganic particles, due to the re-agglomeration of the inorganic particles in a coating solution used to form a coating film, the sedimentation of the inorganic particles or a change in the viscosity of the coating solution is seen, whereby the coating solution is apt to be unstable and coating unevenness may occur in the separator.

As a separator which does not induce the decomposition of an electrolyte advantageously out of separators containing inorganic particles, there is proposed a separator containing magnesium oxide or magnesium hydroxide as the inorganic particles (refer to Patent Documents 5 and 6).

Meanwhile, a separator having high heat resistance is now desired along with the improvement of the energy density of a battery. Heat resistance desired for a separator is called "melt integrity". This is the property of a battery which has high shape stability even at a high temperature and does not lose the function of electrically separating the positive electrode and negative electrode of the battery (refer to Non-Patent Document 1).

PRIOR ART DOCUMENTS

Patent Document 1: JP-A 2008-4439
Patent Document 2: JP-A 2013-133418
Patent Document 3: JP-A 2014-229406
Patent Document 4: JP-A 2013-541128
Patent Document 5: JP-A 2012-134024
Patent Document 6: WO2016/043142 pamphlet

Non-Patent Document

Non-Patent Document 1: editorial supervision by Mr. Noboru Satoh, et al., "Safety Technologies and Materials for Lithium-ion Batteries <<Popular Edition>>, published by CMC Publisher on Sep. 9, 2014, p. 145

DISCLOSURE OF THE INVENTION

Problem to be Solved by the Invention

It is an object of the present invention to provide a coating solution for lithium ion battery separators which can enhance the productivity of a separator by improving the stability of the coating solution used to form a coating layer so as to produce a lithium ion battery separator comprising a substrate and a coating layer containing inorganic particles. It is another object of the present invention to provide a separator having high safety and low internal resistance which is obtained by applying the coating solution to a substrate.

It is still another object of the present invention to provide a separator which comprises a substrate and a coating layer containing magnesium hydroxide as inorganic particles and has high shape stability even when the substrate is melted by heat.

Means for Solving the Problem

The inventors of the present invention conducted intensive studies to solve the above problem and found the following means.

(1) A coating solution for lithium ion battery separators which is used for producing a lithium ion battery separator comprising a substrate and a coating layer containing inorganic particles, wherein the coating solution comprises inorganic particles, an organic polymer binder and carboxymethyl cellulose having an etherification rate of 1.10 to 2.00 or a salt thereof.
(2) The coating solution for lithium ion battery separators in the above paragraph (1), wherein the content of the carboxymethyl cellulose having an etherification rate of 1.10 to 2.00 or salt thereof is 0.1 part or more to less than 2.0 parts by mass based on 100 parts by mass of the inorganic particles.
(3) The coating solution for lithium ion battery separators in the above paragraph (1) or (2), wherein the inorganic particles are of magnesium hydroxide.
(4) The coating solution for lithium ion battery separators in the above paragraph (3), wherein the linseed oil absorption of the magnesium hydroxide is 30 to 80 (g/100 g).
(5) The coating solution for lithium ion battery separators in any one of the above paragraphs (1) to (4), wherein the substrate is a nonwoven fabric.
(6) A lithium ion battery separator comprising a substrate and a coating layer formed on at least one side of the substrate, wherein the coating layer comprises inorganic particles, an organic polymer binder and carboxymethyl cellulose having an etherification rate of 1.10 to 2.00 or a salt thereof.
(7) The lithium ion battery separator in the above paragraph (6), wherein the content of the carboxymethyl cellulose having an etherification rate of 1.10 to 2.00 or salt thereof is 0.1 part or more to less than 2.0 parts by mass based on 100 parts by mass of the inorganic particles.
(8) The lithium ion battery separator in the above paragraph (6) or (7), wherein the inorganic particles are of magnesium hydroxide.
(9) The lithium ion battery separator in the above paragraph (8), wherein the linseed oil absorption of the magnesium hydroxide is 30 to 80 (g/100 g).

(10) The lithium ion battery separator in any one of the above paragraphs (6) to (9), wherein the substrate is a nonwoven fabric.

(11) A coating solution for lithium ion battery separators which is used for producing a lithium ion battery separator comprising a substrate and a coating layer containing inorganic particles, wherein the inorganic particles comprise magnesium hydroxide having a linseed oil absorption of 30 to 80 (g/100 g).

(12) The coating solution for lithium ion battery separators in the above paragraph (11), wherein the substrate is a nonwoven fabric.

(13) A lithium ion battery separator comprising a substrate and a coating layer formed on at least one side of the substrate, wherein the coating layer comprises magnesium hydroxide having a linseed oil absorption of 30 to 80 (g/100 g).

(14) The lithium ion battery separator in the above paragraph (13), wherein the substrate is a nonwoven fabric.

Effect of the Invention

According to the present invention, when a lithium ion battery separator comprising a substrate and a coating layer containing inorganic particles is to be produced, the re-agglomeration of the inorganic particles can be suppressed efficiently by containing carboxymethyl cellulose or a salt thereof having high acid or alkali resistance and an etherification rate of 1.10 to 2.00 in a coating solution for lithium ion battery separators containing inorganic particles which is used to form a coating layer. As a result, the stability of the coating solution can be improved and a lithium ion battery separator having high safety and low internal resistance can be produced with very high productivity.

Further, when magnesium hydroxide having a linseed oil absorption of 30 to 80 (g/100 g) is contained as the inorganic particles, if the substrate is melted by heat, excellent shape stability is obtained, thereby making it possible to produce a lithium ion battery separator having high safety.

BEST MODE FOR CARRYING OUT THE INVENTION

The coating solution for lithium ion battery separators of the present invention is used to produce a lithium ion battery separator comprising a substrate and a coating layer containing inorganic particles. The lithium ion battery separator of the present invention comprises a substrate and a coating layer formed on at least one side of the substrate.

<Coating Solution (1) and Separator (6)>

The coating solution (1) of the present invention is characterized in that it contains inorganic particles, an organic polymer binder and carboxymethyl cellulose (CMC) or a salt thereof (CMC salt) having an etherification rate of 1.10 to 2.00.

The separator (6) of the present invention is characterized in that the coating layer contains inorganic particles, an organic polymer binder and CMC or CMC salt having an etherification rate of 1.10 to 2.00.

<CMC or CMC Salt>

Stated more specifically, the CMC salt is a metal salt. The CMC salt may be a compound in which all of the carboxy groups (—COOH) contained in carboxymethyl cellulose form a salt or a compound in which some of the carboxy groups contained in CMC form a salt. It is preferred that at least 40% of all the carboxy groups should form a salt.

The type of the metal ion contained in the metal salt is an alkali metal ion. Examples of the alkali metal ion include lithium ion, sodium ion and potassium ion. Examples of the CMC salt include lithium carboxymethyl cellulose (CMC-Li), sodium carboxymethyl cellulose (CMC-Na) and potassium carboxymethyl cellulose (CMC-K).

The coating solution (1) and the separator (6) of the present invention contain CMC or CMC salt having an etherification rate of 1.10 to 2.00. The etherification rate of the CMC or CMC salt is preferably 1.13 to 1.90, more preferably 1.15 to 1.80. When the etherification rate is too low, the stability of the coating solution becomes low. When the etherification rate is higher than 2.00, the stable production of the CMC or CMC salt becomes difficult.

The etherification rate of the CMC or CMC salt can be obtained as follows. 0.5 to 0.7 g of the CMC or CMC salt (anhydride) as a sample is precisely weighed and ashed in a magnetic crucible while wrapped in filter paper. After it is cooled, it is transferred into a 500 ml beaker, 250 ml of water is added, 35 ml of sulfuric acid having a concentration of 0.05 mol/liter is added with a pipette, and the resulting mixture is boiled for 30 minutes. The obtained product is then cooled, a phenolphthalein indicator is added, and an excessive acid is back-titrated with potassium hydroxide having a concentration of 0.1 mol/liter to calculate the etherification rate from the following expressions (I) and (II).

$$A=(B \times C - D \times E)/\text{sample anhydride (g)} - \text{alkalinity (or +acidity)} \quad (I)$$

$$\text{Etherification rate} = 162 \times A/(10,000 - 80 \times A) \quad (II)$$

[A]: amount of sulfuric acid having a concentration of 0.05 mol/liter consumed by bonded alkali contained in 1 g of sample (ml)
[B]: amount of sulfuric acid having a concentration of 0.05 mol/liter (ml)
[C]: titer of sulfuric acid having a concentration of 0.05 mol/liter
[D]: titration amount of potassium hydroxide having a concentration of 0.1 mol/liter (ml)
[E]: titer of potassium hydroxide having a concentration of 0.1 mol/liter Alkalinity or acidity in the expression (I) can be obtained as follows. About 1 g of the sample anhydride is accurately weighed and put into a 300 ml triangular flask, and about 200 ml of water is added to dissolve it. 5 ml of sulfuric acid having a concentration of 0.05 mol/liter is added to the resulting solution with a pipette, boiled for 10 minutes and then cooled, and a phenolphthalein indicator is added to titrate with potassium hydroxide having a concentration of 0.1 mol/liter ("F" ml). "G" ml is calculated from the following expression (III) by carrying out blank test at the same time. When the (G-F)E value is (−), alkalinity should read acidity ("E": titer of potassium hydroxide having a concentration of 0.1 mol/liter).

$$\text{Alkalinity} = (G-F)E/\text{sample anhydride (g)} \quad (III)$$

The content of the CMC or CMC salt having an etherification rate of 1.10 to 2.00 in the coating solution (1) and the coating layer of the separator (6) is preferably 0.1 part or more to less than 2.0 parts by mass, more preferably 0.2 part or more to less than 1.9 parts by mass, much more preferably 0.3 part or more to less than 1.8 parts by mass based on 100 parts by mass of the inorganic particles. When the content is too low, an effect obtained by containing the CMC or CMC salt having an etherification rate of 1.00 to 2.00 in the coating solution or the coating layer may not be fully developed. When the content is too high, the internal resistance of the separator may become high.

<Inorganic Particles>

The inorganic particles contained in the coating solution (1) and the coating layer of the separator (6) are not particularly limited if they are preferably used in the coating layer of the separator. Examples thereof include kaolin, fired kaolin, heavy calcium carbonate, light calcium carbonate, magnesium carbonate, zinc oxide, alumina, boehmite, aluminum hydroxide, magnesium hydroxide, titanium dioxide, barium sulfate, zinc sulfate, amorphous silica and calcium silicate. They may be used alone or in combination of two or more. Out of these, alumina, boehmite or magnesium hydroxide is preferred from the viewpoint of heat stability, and magnesium hydroxide is more preferred. Alumina is preferably α-alumina.

The average particle size of the inorganic particles contained in the coating solution (1) and the coating layer of the separator (6) is preferably 0.3 to 4.0 μm, more preferably 0.4 to 3.8 μm, much more preferably 0.5 to 3.5 μm. When the average particle size is smaller than 0.3 μm, the internal resistance of the battery may become high and when the average particle size is larger than 4.0 μm, the separator may become too thick. The average particle size is a volume-standard 50% particle size (D50) obtained from particle size distribution measurement by a laser diffraction method.

When the inorganic particles are magnesium hydroxide having a linseed oil absorption of 30 to 80 (g/100 g), if the substrate is melted by heat, a separator having high shape stability is obtained advantageously. The linseed oil absorption of the magnesium hydroxide is more preferably 50 to 80 (g/100 g).

(Coating Solution (11) and Separator (13)>

The coating solution (11) of the present invention is characterized in that the inorganic particles contain magnesium hydroxide having a linseed oil absorption of 30 to 80 (g/100 g). The separator (13) of the present invention is characterized in that the coating layer contains magnesium hydroxide having a linseed oil absorption of 30 to 80 (g/100 g). The linseed oil absorption of the magnesium hydroxide is more preferably 50 to 80 (g/100 g).

<Linseed Oil Absorption of Magnesium Hydroxide>

The inventors of the present invention conducted studies on the development mechanism of shape stability at the time of heat-melting in a separator comprising a coating layer containing magnesium hydroxide and a substrate. As a result, they found that, when the substrate is melted by heat, the material constituting the substrate which becomes liquid by heat-melting is absorbed by magnesium hydroxide to form a hard oily clay-like product, thus losing fluidity. Thereby, a separator which hardly becomes fluid even when it is melted by heat and therefore has high shape stability is obtained. They further found that, when the linseed oil absorption of magnesium hydroxide used in the coating layer is 30 to 80 (g/100 g), this function is markedly developed.

When the linseed oil absorption of the magnesium hydroxide is less than 30 (g/100 g), all the material constituting the substrate which is melted by heat to become liquid cannot be absorbed by the magnesium hydroxide, whereby it does not lose fluidity and keeps fluid. Therefore, even when the substrate is melted by heat, a separator having high shape stability is not obtained. When the linseed oil absorption of the magnesium hydroxide used in the coating layer is more than 80 (g/100 g), a mixture of the material constituting the substrate which is melted by heat to become liquid and the magnesium hydroxide becomes a brittle cake-like product and easily collapses by external force. Therefore, even when the substrate is melted by heat, a separator having high shape stability is not obtained.

The linseed oil absorption of the magnesium hydroxide is measured in accordance with JIS K5101-13-1:2004 (Test methods for pigments—Part 13: Oil absorption—Section 1: Refined linseed oil method). Magnesium hydroxide is a powder compound produced by a method in which a magnesium salt aqueous solution is treated with alkali or a method in which magnesium oxide is hydrolyzed. From only a viewpoints of obtaining an effect that a separator having high shape stability is obtained even when the substrate is melted by heat, the linseed oil absorption of the magnesium hydroxide should be 30 to 80 (g/100 g), which does not affect properties such as particle size, particle shape and specific surface area. From a viewpoint of reducing the internal resistance and self-discharge of a battery, other characteristic properties, especially particle size of the magnesium hydroxide should have a suitable range. More specifically, the average particle size of the magnesium hydroxide with which both low internal resistance and small self-discharge can be obtained at the same time is preferably 0.3 to 4.0 μm, more preferably 0.4 to 3.0 μm, much more preferably 0.5 to 2.0 μm.

<Organic Polymer Binder>

The organic polymer binder is contained in the coating solution (1) and the coating layer of the separator (6). It is preferred that the organic polymer binder should be contained in the coating solution (11) and the coating layer of the separator (13). The organic polymer binder develops the effect of enhancing the strength of the coating layer. The organic polymer binder is not particularly limited if it is preferably used in the coating layer of the separator. Examples thereof include resins such as ethylene-vinyl acetate copolymer (EVA), (meth)acrylate copolymer, fluorine-based rubber, styrene-butadiene copolymer resin (SBR), polyvinyl alcohol (PVA), polyvinyl butyral (PVB), polyvinyl pyrrolidone (PVP) and polyurethane. A resin into which a crosslinked structure has been introduced to prevent dissolution in a nonaqueous electrolyte may be used in combination with some of these resins. These organic polymer binders may be used alone or in combination of two or more. Out of these, styrene-butadiene copolymer resin (SBR) and (meth)acrylate copolymer are particularly preferred.

The content of the organic polymer binder is preferably 0.5 to 10 parts by mass, more preferably 0.7 to 8 parts by mass, much more preferably 1 to 6 parts by mass based on 100 parts by mass of the inorganic particles. When the content is too low, the strength of the coating layer of the separator may become low. When the content is too high, the internal resistance of the separator may become high.

Additives such as a dispersant exemplified by polyacrylic acid and CMC or CMC salt having an etherification rate of less than 1.10; thickener exemplified by hydroxyethyl cellulose, CMC or CMC salt having an etherification rate of less than 1.10 and polyethylene oxide; wettability enhancer; antiseptic; and antifoaming agent may be blended into the coating solution (1) and the coating layer of the separator (6) as required besides the inorganic particles, the organic polymer binder and the CMC or CMC salt having an etherification rate of 1.10 to 2.00.

The medium for preparing the coating solution (1) is not particularly limited if it can uniformly dissolve or disperse the inorganic particles, the organic polymer binder and the CMC or CMC salt having an etherification rate of 1.10 to 2.00. Examples thereof include water; and organic solvents such as N-methyl-2-pyrrolidone (NMP), 2-butanone, toluene and hexane. The most preferred medium is water.

Additives such as a dispersant exemplified by polyacrylic acid, copolymers thereof and CMC or CMC salt; thickener exemplified by polyethylene oxide, polyacrylamide, hydroxyethyl cellulose and CMC or CMC salt; wettability enhancer; antiseptic; and antifoaming agent may be blended into the coating solution (11) and the coating layer of the separator (13) as required besides the magnesium hydroxide and the organic polymer binder.

The medium for preparing the coating solution (11) is not particularly limited if it can dissolve or disperse the magnesium hydroxide, the organic polymer binder and the additives uniformly, and examples thereof include water; and organic solvents such as NMP, 2-butanone, toluene and hexane. The most preferred medium is water.

In the present invention, examples of the substrate include a porous film, woven fabric, nonwoven fabric, knitted fabric and paper. The porous film is made of a polyolefin such as polyethylene (PE) or polypropylene (PP). The most preferred substrate is a nonwoven fabric which can reduce the internal resistance of the separator.

The content of synthetic resin fibers in the nonwoven fabric is preferably not less than 70 mass %, more preferably not less than 80 mass %, much more preferably not less than 90 mass %. The nonwoven fabric used in the separator of the present invention may be made of only synthetic resin fibers. When the content of the synthetic resin fibers is lower than 70 mass %, the strength of the nonwoven fabric may become too low. The synthetic resin fibers are preferably thermoplastic fibers. When the synthetic resin fibers are thermoplastic fibers and the nonwoven fabric as the substrate is melted by heat, a function that the thermoplastic fibers which are melted by heat to become liquid are absorbed by magnesium hydroxide to form a hard oily clay-like product is easily obtained.

The average fiber diameter of the synthetic resin fibers is preferably 1 to 20 µm, more preferably 1 to 15 µm, much more preferably 1 to 10 µm. When the average fiber diameter is smaller than 1 µm, the fibers become too fine, whereby the coating layer hardly permeates into the inside of the nonwoven fabric, thereby making it difficult to suppress an increase in the thickness of the separator. When the average fiber diameter is larger than 20 µm, it is difficult to reduce the thickness of the nonwoven fabric itself, thereby making it difficult to suppress an increase in the thickness of the separator.

The average fiber diameter in the present invention is an average value obtained by selecting 30 fibers on the cross section vertical or the cross section almost vertical to the lengthwise direction of the fibers forming the nonwoven fabric and measuring the fiber diameters of these fibers from a scanning electron photomicrograph of the cross section of the nonwoven fabric. The synthetic resin fibers may be melted or deformed by heat or pressure. In this case, the cross sectional area is measured to calculate a fiber diameter in terms of a perfect circle.

The fiber length of each synthetic resin fiber is preferably 1 to 15 mm, more preferably 2 to 10 mm, much more preferably 2 to 5 mm. When the fiber length is smaller than 1 mm, the synthetic resin fibers may fall off from the nonwoven fabric and when the fiber length is larger than 15 mm, the fibers may entangle with one another to form a lump, resulting in uneven thickness.

Examples of the resin constituting the synthetic resin fibers include polyolefin, polyester, polyvinyl acetate, ethylene-vinyl acetate copolymer, polyamide, acryl, polyvinyl chloride, polyvinylidene chloride, polyvinyl ether, polyvinyl ketone, polyether, polyvinyl alcohol, diene resin, polyurethane, phenol resin, melamine resin, furan resin, urea resin, aniline resin, unsaturated polyester, alkyd resin, fluorine resin, silicone, polyamide imide, polyphenylene sulfide, polyimide, polycarbonate, polyazomethine, polyester amide, polyether ether ketone, poly-p-phenylene benzobisoxazole, polybenzimidazole and ethylene-vinyl alcohol copolymer. Copolymers of these resins may also be used. Out of these resins, polyester resin, acrylic resin and polyolefin resin are preferably used to enhance adhesion to the coating layer. To enhance the heat resistance of the separator, polyester resin, acrylic resin and polyamide resin are preferably used.

Examples of the polyester resin include polyethylene terephthalate (PET), polybutylene terephthalate (PBT), polytrimethylene terephthalate (PTT), polyethylene naphthalate (PEN), polybutylene naphthalate (PBN), polyethylene isophthalate and wholly aromatic polyester resin. Copolymers thereof may also be used. Out of these resins, polyethylene terephthalate resin is preferred to improve heat resistance, electrolyte resistance and adhesion to an inorganic particle layer.

Examples of the acrylic resin include a polymer of 100% acrylonitrile and copolymers obtained by copolymerizing acrylic acid, methacrylic acid or a (meth)acrylic acid derivative such as acrylic acid ester or methacrylic acid ester, or vinyl acetate with acrylonitrile.

Examples of the polyolefin resin include polypropylene, polyethylene, polymethyl pentene, ethylene-vinyl alcohol copolymers and olefin copolymers.

Examples of the polyamide resin include aliphatic polyamides such as nylon, wholly aromatic polyamides such as poly-p-phenylene terephthalamide, copoly(para-phenylene-3,4'-oxydiphenylene terephthalamide) and poly-m-phenylene isophthalamide, and semi-aromatic polyamides having a fat chain in part of the main chain in wholly aromatic polyamides.

The term "semi-aromatic" refers to a polyamide having a fat chain in part of the main chain. The wholly aromatic polyamides may be either para-type or meta-type polyamides.

The synthetic resin fibers may be fibers (single fibers) made of a single resin or fibers (conjugated fibers) made of two or more resins. The synthetic resin fibers contained in the nonwoven fabric substrate may be used for one type or two or more different types. The conjugated fibers may be sheath-core type, eccentric type, side-by-side type, sea-island type, orange type or multiple bimetal type. Fibers obtained by splitting the conjugated fibers may be used.

The nonwoven fabric may contain fibers other than the synthetic resin fibers. Examples thereof include short fibers of solvent-spun cellulose or regenerated cellulose: fibrillated products of solvent-spun cellulose or regenerated cellulose; natural cellulose fibers; pulped products of natural cellulose fibers; fibrillated product of natural cellulose fibers; inorganic fibers; fibrillated products of synthetic resins; and pulped products of synthetic resins.

The weight of the nonwoven fabric is preferably 6 to 20 $g/m^2$, more preferably 7 to 18 $g/m^2$, much more preferably 8 to 15 $g/m^2$. When the weight is larger than 20 g/m, it may be difficult to reduce the thickness of the separator. When the weight is smaller than 6 $g/m^2$, it may be difficult to obtain sufficiently high strength. The weight is measured by a method specified in JIS P 8124:2011 (Paper and board-determination of grammage).

The thickness of the nonwoven fabric is preferably 9 to 30 μm, more preferably 10 to 27 μm, much more preferably 11 to 24 μm. When the thickness is smaller than 9 μm, sufficiently high strength may not be obtained. When the thickness is larger than 30 μm, it may be difficult to reduce the thickness of the separator. The thickness is a value measured under a load of 5 N by using an external micrometer specified in JIS B 7502:2016 (micrometers).

To produce the nonwoven fabric, a method of producing a nonwoven fabric by forming a fiber web and bonding together fibers in the fiber web may be employed. The obtained nonwoven fabric may be used as the substrate directly, or a laminate consisting of a plurality of nonwoven fabrics may be used as the substrate. Examples of the method of producing a fiber web include dry methods such as carding, air-laying, spunbonding and melt blowing methods; wet methods such as wet papermaking method; and electrostatic spinning method. A web obtained by the wet method is homogeneous and dense and may be advantageously used as a substrate for separators. The wet method is a method for obtaining a fiber web from a homogeneous papermaking slurry prepared by dispersing fibers in water by using a paper machine having at least one papermaking system such as cylinder, Fourdrinier or inclination system.

In the method of producing the nonwoven fabric from the fiber web, fibers are bonded together by a fiber bonding method selected from the group consisting of adhesion, fusion and entanglement. As the fiber bonding method, spun lacing, needle punching and binder adhesion methods may be used. As the binder adhesion method, a chemical bonding method in which fibers are bonded together with a binder applied to a fiber web and a thermal bonding method in which fibers are bonded together with synthetic resin fibers for binders contained in a fiber web may be employed. Particularly when the above wet method is used with emphasis on uniformity, the thermal bonding method is preferably used to adhere synthetic resin fibers for binders. A uniform nonwoven fabric is formed from a uniform fiber web by the thermal bonding method.

It is preferred that pressure should be applied to the nonwoven fabric by a calender to adjust its thickness or make its thickness even. It is preferred that pressure should be applied at a temperature at which the synthetic resin fibers for binders are not formed into a film (this temperature is 20° C. or more lower than the melting point or softening point of the synthetic resin fibers for binders).

The separator (6) of the present invention can be produced by applying the coating solution (1) of the present invention to the substrate. The separator (13) of the present invention can be produced by applying the coating solution (11) of the present invention to the substrate. The coating solution may be applied to one side of the substrate or both sides of the substrate. Or, the coating solution may be applied to one side of the substrate two times or more.

To apply the coating solution to the substrate, various coating apparatuses may be used. As for the coating means, coating systems such as blade, rod, reverse roll, lip, die, curtain and air knife coating systems, printing systems such as flexo, screen, offset, gravure and ink jet printing systems, transfer systems such as roll transfer and film transfer systems, and pull-up systems such as dipping may be selected and used as required.

The weight of the separator of the present invention is preferably 10 to 36 g/m$^2$, more preferably 12 to 32 g/m$^2$, much more preferably 14 to 27 g/m$^2$. When the weight is larger than 36 g/ml, the internal resistance may become too high. When the weight is smaller than 10 g/m$^2$, a pin hole may be readily made, or sufficiently high strength may be hardly obtained.

The thickness of the separator of the present invention is preferably 10 to 40 μm, more preferably 11 to 30 μm, much more preferably 12 to 25 μm. When the thickness is larger than 40 μm, the obtained lithium ion battery separator becomes too thick, whereby internal resistance may become high. When the thickness is smaller than 10 μm, a pinhole may be readily made, or sufficiently high strength may be hardly obtained.

EXAMPLES

The following examples are provided for the purpose of further illustrating the present invention but are in no way to be taken as limiting. In the examples, percentage (%) and parts are all based on mass unless otherwise stated. The amount of coating is the weight of dry coating (coating weight (in an absolute dry state)).

<<Coating Solution (1) and Separator (6)>>
(Production of substrate 1)

50 parts of oriented crystallized PET short fibers (drawn PET fibers) having a fineness of 0.1 dtex (average fiber diameter of 3.0 μm) and a fiber length of 3 mm and 50 parts of single-component PET short fibers for binders having a fineness of 0.2 dtex (average fiber diameter of 4.3 μm) and a fiber length of 3 mm (undrawn PET fibers, softening point of 120° C., melting point of 230° C.) were dispersed in water with a pulper to prepare a homogeneous papermaking slurry having a concentration of 1%. This papermaking slurry was formed into a sheet by a wet system with a cylinder paper machine to thermally bond together the PET short fibers for binders and the intersection points between the PET short fibers for binders and the oriented crystallized PET short fibers with a 135° C. cylinder drier so as to develop tensile strength, thereby obtaining a nonwoven fabric having a weight of 10 g/m$^2$. Further, this nonwoven fabric was thermally calendered by using a one-nip thermal calender having a dielectric heating jacket roll (metal heating roll) and an elastic roll at a heating roll temperature of 200° C., a linear pressure of 100 kN/m and a processing speed of 30 m/min to produce a nonwoven fabric having a thickness of 15 μm as a substrate 1.

<Substrate 2>

A porous polypropylene film (weight of 12 g/m$^2$, thickness of 20 μm, porosity of 40%) was used as a substrate 2.

Example 1

After 90 parts of a 2% CMC-Na aqueous solution (solid content of 1.8 parts) was added to and mixed with a dispersion prepared by dispersing 100 parts of magnesium hydroxide having an average particle size of 1.0 μm in 140 parts of water under agitation, 10 parts of a carboxy-modified styrene-butadiene copolymer resin emulsion (solid content concentration of 50%, glass transition point of −18° C., average particle size of 0.2 μm) as an organic polymer binder was added to and mixed with the resulting mixture under agitation, and finally 16 parts of conditioned water was added to adjust the solid content concentration to 30% so as to prepare a coating solution "a1". CMC-Na having a viscosity at 25° C. of a 1% aqueous solution of 3,500 mPa·s and an etherification rate of 2.00 was used. Magnesium hydroxide having a linseed oil absorption of 66 (g/100 g) was used.

Example 2

A coating solution "a2" was prepared in the same manner as the coating solution "a1" except that CMC-Na having a viscosity at 25° C. of a 1% aqueous solution of 3,300 mPa·s and an etherification rate of 1.80 was used in place of the CMC-Na having an etherification rate of 2.00.

Example 3

A coating solution "a3" was prepared in the same manner as the coating solution "a1" except that CMC-Na having a viscosity at 25° C. of a 1% aqueous solution of 3,000 mPa·s and an etherification rate of 1.15 was used in place of the CMC-Na having an etherification rate of 2.00.

Example 4

A coating solution "a4" was prepared in the same manner as the coating solution "a1" except that CMC-Na having a viscosity at 25° C. of a 1% aqueous solution of 2,500 mPa·s and an etherification rate of 1.10 was used in place of the CMC-Na having an etherification rate of 2.00.

Example 5

After 4 parts of a 2% CMC-Na aqueous solution (solid content of 0.08 part) was added to and mixed with a dispersion prepared by dispersing 100 parts of magnesium hydroxide having an average particle size of 1.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 96 parts of conditioned water was added to adjust the solid content concentration to 30% so as to prepare a coating solution "a5". CMC-Na having a viscosity at 25° C. of a 1% aqueous solution of 3,000 mPa·s and an etherification rate of 1.15 was used. Magnesium hydroxide having a linseed oil absorption of 66 (g/100 g) was used.

Example 6

After 5 parts of a 2% CMC-Na aqueous solution (solid content of 0.10 part) was added to and mixed with a dispersion prepared by dispersing 100 parts of magnesium hydroxide having an average particle size of 1.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 95 parts of conditioned water was added to adjust the solid content concentration to 30% so as to prepare a coating solution "a6". CMC-Na having a viscosity at 25° C. of a 1% aqueous solution of 3,000 mPa·s and an etherification rate of 1.15 was used. Magnesium hydroxide having a linseed oil absorption of 66 (g/100 g) was used.

Example 7

After 95 parts of a 2% CMC-Na aqueous solution (solid content of 1.9 parts) was added to and mixed with a dispersion prepared by dispersing 100 parts of magnesium hydroxide having an average particle size of 1.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 11 parts of conditioned water was added to adjust the solid content concentration to 30% so as to prepare a coating solution "a7". CMC-Na having a viscosity at 25° C. of a 1% aqueous solution of 3,000 mPa's and an etherification rate of 1.15 was used. Magnesium hydroxide having a linseed oil absorption of 66 (g/100 g) was used.

Example 8

After 100 parts of a 2% CMC-Na aqueous solution (solid content of 2.0 parts) was added to and mixed with a dispersion prepared by dispersing 100 parts of magnesium hydroxide having an average particle size of 1.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 7 parts of conditioned water was added to adjust the solid content concentration to 30% so as to prepare a coating solution "a8". CMC-Na having a viscosity at 25° C. of a 1% aqueous solution of 3,000 mPa·s and an etherification rate of 1.15 was used. Magnesium hydroxide having a linseed oil absorption of 66 (g/100 g) was used.

Example 9

After 75 parts of a 2% CMC-Na aqueous solution (solid content of 1.5 parts) was added to and mixed with a dispersion prepared by dispersing 100 parts of boehmite having an average particle size of 2.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 30 parts of conditioned water was added to adjust the solid content concentration to 30% so as to prepare a coating solution "a9". CMC-Na having a viscosity at 25° C. of a 1% aqueous solution of 3,100 mPa·s and an etherification rate of 1.40 was used.

Example 10

A coating solution "a10" was prepared in the same manner as the coating solution "a9" except that α-alumina having an average particle size of 0.3 µm was used in place of boehmite having an average particle size of 2.0 µm.

Example 11

A coating solution "a11" was prepared in the same manner as the coating solution "a9" except that α-alumina having an average particle size of 0.5 µm was used in place of boehmite having an average particle size of 2.0 µm.

Example 12

After 1 part of a 50% acrylic acid-based dispersant (solid content of 0.5 part) was added to 140 parts of water, 100 parts of magnesium hydroxide having a linseed oil absorption of 44 (g/100 g) and an average particle size of 3.0 µm was added slowly under agitation to be dispersed in the resulting solution. After the end of dispersion, 90 parts of a 2% CMC-Na aqueous solution (solid content of 1.8 parts) and 10 parts of a carboxy-modified styrene-butadiene copolymer emulsion (solid content concentration of 50%, glass transition point of −18° C., average particle size of 0.2 µm) (solid content of 5 parts) as an organic polymer binder were added sequentially under agitation, and finally conditioned water was added to adjust the solid concentration to 30% so as to prepare a coating solution "b1". CMC-Na having a viscosity at 25° C. of a 1% aqueous solution of 3,000 mPa·s and an etherification rate of 1.15 was used.

Example 13

A coating solution "b2" was prepared in the same manner as the preparation of the coating solution "b1" except that magnesium hydroxide having a linseed oil absorption of 66 (g/100 g) and an average particle size of 1.0 µm was used.

Example 14

A coating solution "b3" was prepared in the same manner as the preparation of the coating solution "b1" except that magnesium hydroxide having a linseed oil absorption of 72 (g/100 g) and an average particle size of 0.6 µm was used.

Example 15

A coating solution "b4" was prepared in the same manner as the preparation of the coating solution "b1" except that magnesium hydroxide having a linseed oil absorption of 33 (g/100 g) and an average particle size of 2.0 µm was used.

Example 16

A coating solution "b5" was prepared in the same manner as the preparation of the coating solution "b1" except that magnesium hydroxide having a linseed oil absorption of 74 (g/100 g) and an average particle size of 0.4 µm was used.

Example 17

A coating solution "b6" was prepared in the same manner as the preparation of the coating solution "b1" except that magnesium hydroxide having a linseed oil absorption of 27 (g/100 g) and an average particle size of 1.0 µm was used.

Example 18

A coating solution "b7" was prepared in the same manner as the preparation of the coating solution "b1" except that magnesium hydroxide having a linseed oil absorption of 85 (g/100 g) and an average particle size of 0.5 µm was used.

Comparative Example 1

After 90 parts of a 2% CMC-Na aqueous solution (solid content of 1.8 parts) was added to and mixed with a dispersion prepared by dispersing 100 parts of magnesium hydroxide having an average particle size of 1.0 µm in 140 parts of water under agitation, 10 parts of a carboxy-modified styrene-butadiene copolymer resin emulsion (solid content concentration of 50%, glass transition point of −18° C., average particle size of 0.2 µm) as an organic polymer binder was added to and mixed with the resulting mixture under agitation, and finally 16 parts of conditioned water was added to adjust the solid content concentration to 30% so as to prepare a comparative coating solution "c1". CMC-Na having a viscosity at 25° C. of a 1% aqueous solution of 3,000 mPa's and an etherification rate of 1.00 was used. The linseed oil absorption of the magnesium hydroxide was 66(g/100 g).

Comparative Example 2

10 parts of a carboxy-modified styrene-butadiene copolymer resin emulsion (solid content concentration of 50%, glass transition point of −18° C., average particle size of 0.2 µm) as an organic polymer binder was added to and mixed with a dispersion prepared by dispersing 100 parts of magnesium hydroxide having an average particle size of 1.0 µm in 140 parts of water under agitation, and finally 100 parts of conditioned water was added to adjust the solid content concentration to 30% so as to prepare a comparative coating solution "c2". The linseed oil absorption of magnesium hydroxide was 66 (g/100 g).

<Stability of Coating Solution; Evaluation of Sedimentation>

After the coating solutions of Examples and Comparative Examples were left to stand for 24 hours, the sedimentation of dispersed particles was checked and classified into the following three levels.
○: no sediment
Δ: small amount of sediment
×: existence of sediment <Stability of Coating Solution; Evaluation of Viscosity Change>

The viscosity of each of the coating solutions of Examples and Comparative Examples before and after 24 hours of standing was measured to obtain the magnification of a viscosity change from the expression (viscosity change=viscosity after standing/viscosity before standing) so as to classify into the following three levels.
○: viscosity change is less than 1.5 times
Δ: viscosity change is 1.5 times or more to less than 2.0 times
×: viscosity change is 2.0 times or more <Lithium Ion Battery Separators of Examples 1 to 10, 12 to 18 and Comparative Examples 1 and 2>

Each of the coating solutions of Examples 1 to 10 and 12 to 18 and Comparative Examples 1 and 2 was applied to the above substrate 1 with a reverse gravure coater as a coating apparatus to a coating weight of 10.0 g/m$^2$ (in an absolute dry state) and dried to obtain a lithium ion battery separator.

<Lithium Ion Battery Separator of Example 11>

The coating solution of Example 11 was applied to the above substrate 2 with a reverse gravure coater as a coating apparatus to a coating weight of 10.0 g/m$^2$ (in an absolute dry state) and dried to obtain a lithium ion battery separator.

<Production of Batteries for Evaluation>

Batteries for evaluation including lithium manganate as a positive electrode, a mesocarbon micro-bead as a negative electrode and a 1 mol/L diethyl carbonate/ethylene carbonate mixed solvent solution (volume ratio of 7/3) of lithium hexafluorophosphate as an electrolyte and having a design capacity of 30 mAh were manufactured by using the above separators.

<Evaluation of Internal Resistance>

After five cycles of shakedown charging and discharging consisting of 60 mA constant-current charging, 4.2 V constant-voltage charging (1 hour), 60 mA constant-current discharging and the next cycle when the voltage became 2.8 V were carried out, 60 mA constant-current charging, 4.2 V constant-voltage charging (1 hour), 30 minutes of 6 mA constant-current discharging (discharge amount of 3 mAh), the measurement of voltage right before the end of discharging (voltage "a"), 60 mA constant-current charging, 4.2 V constant-voltage charging (1 hour), 2 minutes of 90 mA constant-current discharging (discharge amount of 3 mAh) and the measurement of voltage (voltage "b") right before the end of discharging were carried out to obtain internal resistance from the expression (internal resistance Ω=(voltage "a"–voltage "b")/(90 mA–6 mA) for each of the manufactured batteries. The results are shown in Table 1.

○: internal resistance is less than 4Ω.
Δ: internal resistance is 4Ω or more to less than 5Ω.
x: internal resistance is 5Ω or more.

<Evaluation of Shape Stability when Nonwoven Fabric Substrate is Melted>

A hot blast whose temperature was changed by 10° C. each time was applied to each of the lithium ion battery separators of Examples 12 to 18 by using a hot air apparatus for solder rework operation to evaluate the lowest temperature at which a hole was made in the separator. The results are shown in Table 1. As the temperature of the hot blast in this test becomes higher, a hole is more easily made in the separator. It can be said that a separator in which a hole is not made at a higher temperature is a separator having higher shape stability when the substrate is melted since it can keep the function of electronically separating the positive and negative electrodes of the battery at a wider temperature range.

binder, sedimentation or a big viscosity change was not seen, the coating solutions had excellent stability, and batteries comprising these manufactured separators had low internal resistance.

Meanwhile, since the coating solution "c1" for lithium ion battery separators prepared in Comparative Example 1 contained sodium carboxymethyl cellulose having an etherification rate of less than 1.10, a viscosity change was seen at the time of standing and the stability of the coating solution was low.

Since the coating solution "c2" for lithium ion battery separators prepared in Comparative Example 2 did not contain sodium carboxymethyl cellulose, sedimentation was observed and the stability of the coating solution was low.

Since the coating solution "a4" for lithium ion battery separators prepared in Example 4 contained sodium carboxymethyl cellulose having a slightly low etherification rate of 1.10, a small viscosity change was seen after 24 hours of standing.

Since the coating solution "a5" for lithium ion battery separators prepared in Example 5 containing inorganic particles and an organic polymer binder contained a slightly small amount of sodium carboxymethyl cellulose having an etherification ratio of 1.10 to 2.00, sedimentation was slightly observed after 24 hours of standing.

The coating solution "a8" for lithium ion battery separators prepared in Example 8 containing inorganic particles and an organic polymer binder contained a slightly large amount of sodium carboxymethyl cellulose having an etherification ratio of 1.10 to 2.00, the internal resistance of the separator became slightly high.

TABLE 1

| | Coating solution | Substrate | Weight of separator (g/m$^2$) | Thickness of separator (μm) | Etherification rate of CMC-Na | Content of CMC-Na (number of parts based on 100 parts of inorganic particles) | Linseed oil absorption of magnesium hydroxide (g/100 g) | Sedimentation of coating solution | Viscosity change of coating solution | Internal resistance of separator | Lowest temperature at which a hole is made ° C. |
|---|---|---|---|---|---|---|---|---|---|---|---|
| Ex. 1 | a1 | 1 | 20 | 22 | 2.00 | 1.8 | 66 | ○ | ○ | ○ | — |
| Ex. 2 | a2 | 1 | 20 | 22 | 1.80 | 1.8 | 66 | ○ | ○ | ○ | — |
| Ex. 3 | a3 | 1 | 20 | 22 | 1.15 | 1.8 | 66 | ○ | ○ | ○ | — |
| Ex. 4 | a4 | 1 | 20 | 22 | 1.10 | 1.8 | 66 | ○ | Δ | ○ | — |
| Ex. 5 | a5 | 1 | 20 | 22 | 1.15 | 0.08 | 66 | Δ | ○ | ○ | — |
| Ex. 6 | a6 | 1 | 20 | 22 | 1.15 | 0.10 | 66 | ○ | ○ | ○ | — |
| Ex. 7 | a7 | 1 | 20 | 22 | 1.15 | 1.9 | 66 | ○ | ○ | ○ | — |
| Ex. 8 | a8 | 1 | 20 | 22 | 1.15 | 2.0 | 66 | ○ | ○ | Δ | — |
| Ex. 9 | a9 | 1 | 20 | 23 | 1.40 | 1.5 | — | ○ | ○ | ○ | — |
| Ex. 10 | a10 | 1 | 20 | 21 | 1.40 | 1.5 | — | ○ | ○ | ○ | — |
| Ex. 11 | a11 | 2 | 22 | 26 | 1.40 | 1.5 | — | ○ | ○ | Δ | — |
| Ex. 12 | b1 | 1 | 20 | 24 | 1.15 | 1.8 | 44 | ○ | ○ | ○ | 350 |
| Ex. 13 | b2 | 1 | 20 | 22 | 1.15 | 1.8 | 66 | ○ | ○ | ○ | 370 |
| Ex. 14 | b3 | 1 | 20 | 21 | 1.15 | 1.8 | 72 | ○ | ○ | ○ | 370 |
| Ex. 15 | b4 | 1 | 20 | 23 | 1.15 | 1.8 | 33 | ○ | ○ | ○ | 330 |
| Ex. 16 | b5 | 1 | 20 | 21 | 1.15 | 1.8 | 74 | ○ | ○ | ○ | 360 |
| Ex. 17 | b6 | 1 | 20 | 22 | 1.15 | 1.8 | 27 | ○ | ○ | ○ | 270 |
| Ex. 18 | b7 | 1 | 20 | 21 | 1.15 | 1.8 | 85 | ○ | ○ | ○ | 280 |
| C. Ex. 1 | c1 | 1 | 20 | 21 | 1.00 | 1.8 | 66 | ○ | x | ○ | — |
| C. Ex. 2 | c2 | 1 | 20 | 21 | — | — | 66 | x | ○ | ○ | — |

Ex.: Example, C. Ex.: Comparative Example

As shown in Table 1, since the coating solutions "a1" to "a11" and "b1" to "b7" for lithium ion battery separators prepared in Examples 1 to 11 and 12 to 18 were produced by containing sodium carboxymethyl cellulose having an etherification rate of 1.10 to 2.00 in a coating solution containing inorganic particles and an organic polymer The lithium ion battery separator manufactured in Example 11 had slightly high internal resistance since a porous film was used as the substrate.

In the lithium ion battery separators of Examples 12 to 16 which contained magnesium hydroxide having a linseed oil absorption of 30 to 80 (g/100 g), the lowest temperature at which a hole was made was 330 to 370° C. which is much higher than 270° C. in the separator of Example 17 containing magnesium hydroxide having a linseed oil absorption of less than 30 (g/100 g) and 280° C. in the separator of Example 18 containing magnesium hydroxide having a linseed oil absorption of more than 80 (g/100 g). Thus, these separators had high shape stability.

<<Coating Solution (11) and Separator (13)>>

(Coating Solution "α1")

After 1 part of a 50% acrylic acid-based dispersant (solid content of 0.5 part) was mixed with 140 parts of water, 100 parts of magnesium hydroxide having a linseed oil absorption of 44 (g(100 g) and an average particle size of 3.0 μm was added slowly under agitation to be dispersed in the resulting solution. After the end of dispersion, 90 parts of a 2% CMC-Na aqueous solution (solid content of 1.8 parts) and 10 parts of a carboxy-modified styrene-butadiene copolymer resin emulsion (solid content concentration of 50%, glass transition point of −18° C., average particle size of 0.2 μm) (solid content of 5 parts) as an organic polymer binder were added to the obtained dispersion sequentially under agitation, and finally conditioned water was added to adjust the solid content concentration to 30% so as to prepare a coating solution "α1".

(Coating Solution "α2")

A coating solution "α2" was prepared in the same manner as the preparation of "α1" except that magnesium hydroxide having a linseed oil absorption of 66 (g/100 g) and an average particle size of 1.0 μm was used.

(Coating Solution "α3")

A coating solution "α3" was prepared in the same manner as the preparation of "α1" except that magnesium hydroxide having a linseed oil absorption of 72 (g/100 g) and an average particle size of 0.6 μm was used.

(Coating Solution "α4")

A coating solution "α4" was prepared in the same manner as the preparation of "α1" except that magnesium hydroxide having a linseed oil absorption of 33 (g/100 g) and an average particle size of 2.0 μm was used.

(Coating Solution "α5")

A coating solution "α5" was prepared in the same manner as the preparation of "α1" except that magnesium hydroxide having a linseed oil absorption of 74 (g/100 g) and an average particle size of 0.4 μm was used.

(Comparative Coating Solution "β1")

A comparative coating solution "β1" was prepared in the same manner as the preparation of "α1" except that magnesium hydroxide having a linseed oil absorption of 27 (g/100 g) and an average particle size of 1.0 μm was used.

(Comparative Coating Solution "β2")

A comparative coating solution "β2" was prepared in the same manner as the preparation of "α1" except that magnesium hydroxide having a linseed oil absorption of 85 (g/100 g) and an average particle size of 0.5 μm was used.

<Manufacture of Lithium Ion Battery Separator>

The lithium ion battery separators of Examples 19 to 23 and Comparative Examples 3 and 4 were obtained by applying the coating solutions "α1" to "α5" and comparative coating solutions "β1" and "β2" to the above nonwoven fabric substrates, respectively, with a reverse gravure coater as a coating apparatus to a coating weight (in an absolute dry state) of 10.0 g/m² and drying them.

<Evaluation of Shape Stability when Nonwoven Fabric Substrate is Melted>

A hot blast whose temperature was changed by 10° C. each time was applied to each of the above lithium ion battery separators by using a hot air apparatus for solder rework operation to evaluate the lowest temperature at which a hole was made in the separator. The results are shown in Table 2. As the temperature of the hot blast in this test becomes higher, a hole is more easily made in the separator. It can be said that a separator in which a hole is not made at a higher temperature is a separator having higher shape stability when the substrate is melted since it can keep the function of separating electronically the positive and negative electrodes of the battery at a wider temperature range.

TABLE 2

| | Characteristic properties of magnesium hydroxide | | |
|---|---|---|---|
| | Linseed oil absorption (g/100 g) | Average particle size μm | Lowest temperature at which a hole is made ° C. |
| Example 19 | 44 | 3.0 | 350 |
| Example 20 | 66 | 1.0 | 370 |
| Example 21 | 72 | 0.6 | 370 |
| Example 22 | 33 | 2.0 | 330 |
| Example 23 | 74 | 0.4 | 360 |
| C. Ex. 3 | 27 | 1.0 | 270 |
| C. Ex. 4 | 85 | 0.5 | 280 |

C. Ex.: Comparative Example

As shown in Table 2, in the lithium ion battery separators of Examples 19 to 23 which contained magnesium hydroxide having a linseed oil absorption of 30 to 80 (g/100 g), the lowest temperature at which a hole was made was 330 to 370° C. It is much higher than 270° C. in the separator of Comparative Example 3 which contained magnesium hydroxide having a linseed oil absorption of less than 30 (g/100 g) and 280° C. in the separator of Comparative Example 4 which contained magnesium hydroxide having a linseed oil absorption of more than 80 (g/100 g). Thus, these separators had high shape stability.

INDUSTRIAL APPLICABILITY

The coating solution for lithium ion battery separators and the lithium ion battery separator of the present invention can be used in the production of a lithium ion battery having high safety and low internal resistance.

The invention claimed is:

1. A lithium ion battery separator comprising a substrate and a coating layer formed on at least one side of the substrate, wherein the coating layer comprises inorganic particles, an organic polymer binder and carboxymethyl cellulose having an etherification rate of 1.10 to 2.00 or a salt thereof, and the inorganic particles are of magnesium hydroxide having a linseed oil absorption of 30 to 80 (g/100 g).

2. The lithium ion battery separator according to claim 1, wherein the content of the carboxymethyl cellulose having an etherification rate of 1.10 to 2.00 or salt thereof is 0.1 part or more to less than 2.0 parts by mass based on 100 parts by mass of the inorganic particles.

3. The lithium ion battery separator according to claim 1, wherein the substrate is a nonwoven fabric.

* * * * *